US012639224B2

(12) United States Patent
Liu et al.

(10) Patent No.: US 12,639,224 B2
(45) Date of Patent: *May 26, 2026

(54) CACHE KEY UPDATING USING GROUP KEY AND VERSION INFORMATION

(71) Applicant: Zoom Communications, Inc., San Jose, CA (US)

(72) Inventors: Chunhui Liu, Hefei City (CN); Hongjian Zhao, Campbell, CA (US); Jian Zhou, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/977,299

(22) Filed: Dec. 11, 2024

(65) Prior Publication Data

US 2025/0103504 A1 Mar. 27, 2025

Related U.S. Application Data

(63) Continuation of application No. 17/443,401, filed on Jul. 26, 2021, now Pat. No. 12,197,337, which is a continuation of application No. PCT/CN2021/096746, filed on May 28, 2021.

(51) Int. Cl.
| | |
|---|---|
| *G06F 16/00* | (2019.01) |
| *G06F 12/0864* | (2016.01) |
| *G06F 16/23* | (2019.01) |
| *G06F 16/957* | (2019.01) |

(52) U.S. Cl.
CPC ...... *G06F 12/0864* (2013.01); *G06F 16/2379* (2019.01); *G06F 16/9574* (2019.01); *G06F 2212/608* (2013.01)

(58) Field of Classification Search
CPC ............ G06F 16/2379; G06F 16/9574; G06F 12/0864
USPC .................................................. 707/741, 790
See application file for complete search history.

(56) References Cited

U.S. PATENT DOCUMENTS

| | | | |
|---|---|---|---|
| 7,624,126 B2 * | 11/2009 | Pizzo ................. | G06F 16/9574 |
| 9,436,710 B2 | 9/2016 | Shoolman et al. | |
| 2013/0226971 A1 * | 8/2013 | Shoolman .......... | G06F 16/2228 |
| | | | 707/790 |
| 2020/0310837 A1 | 10/2020 | Sethumadhavan et al. | |

* cited by examiner

*Primary Examiner* — Chelcie L Daye
(74) *Attorney, Agent, or Firm* — Young Basile Hanlon & MacFarlane, P.C.

(57) ABSTRACT

A versioning group cache system uses cache keys which each include, amongst other things, version information and a group key. When a cache key is first updated to include these, the cache system determines the group key and adds version information thereto to produce the cache key, which is mapped to cached data. When the cache key is later updated, the version information is updated to produce an updated cache key which is mapped to the cached data. The cache key updating is in response to a change request received at the cache system. The change request includes a command processable at the cache system in connection with cached data and/or cache keys. For example, the change request may be a request for a batch deletion of cache keys. The versioning group cache system fulfills the change requests with efficient use of system resources.

20 Claims, 8 Drawing Sheets

700

*category::identifier*

702 704

*category::group_id, identifier*

706 702

*vg_category::group_id*

708 710 702 704

*v_{group_version}_category::group_id, identifier*

800

802 RECEIVE CHANGE REQUEST

804 CACHE KEY HAVING GROUP KEY STORED IN CACHE SYSTEM?

NO

YES

806 UPDATE VERSION INFORMATION FOR CACHE KEY

808 PRODUCE UPDATED CACHE KEY

810 DETERMINE GROUP KEY

812 ADD VERSION INFORMATION TO GROUP KEY

814 PRODUCE UPDATED CACHE KEY

CACHE KEY UPDATING USING GROUP KEY AND VERSION INFORMATION

CROSS-REFERENCE TO RELATED APPLICATION(S)

This application is a continuation of U.S. application Ser. No. 17/443,401, filed Jul. 26, 2021, which is a bypass continuation of International Patent Application No. PCT/CN2021/096746, filed May 28, 2021, the disclosures of which are herein incorporated by reference in their entirety.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of versioning group cache systems and techniques therefor.

One aspect of this disclosure is a method, which includes determining a group key for an initial cache key stored in a cache system responsive to a change request, producing an updated cache key based on the group key and version information added to the group key, and mapping the updated cache key within the cache system to data previously associated with the initial cache key.

Another aspect of this disclosure is an apparatus, which includes a memory and a processor configured to execute instructions stored in the memory to: determine whether a cache key having a group key is stored in a cache system responsive to a change request; responsive to a determination that the cache key is stored in the cache system, update version information associated with the cache key to produce a first updated cache key; and, responsive to a determination that the cache key is not stored in the cache system: determine the group key based on an initial cache key associated with the change request; and produce a second updated cache key based on the group key and version information added to the group key.

Yet another aspect of this disclosure is a system, which includes a server device implementing a cache system configured to responsive to a change request identifying a group key associated with a cache key, produce an updated cache key for data associated with the cache key based on the group key and an update to version information associated with the cache key, and map the updated cache key to the data.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
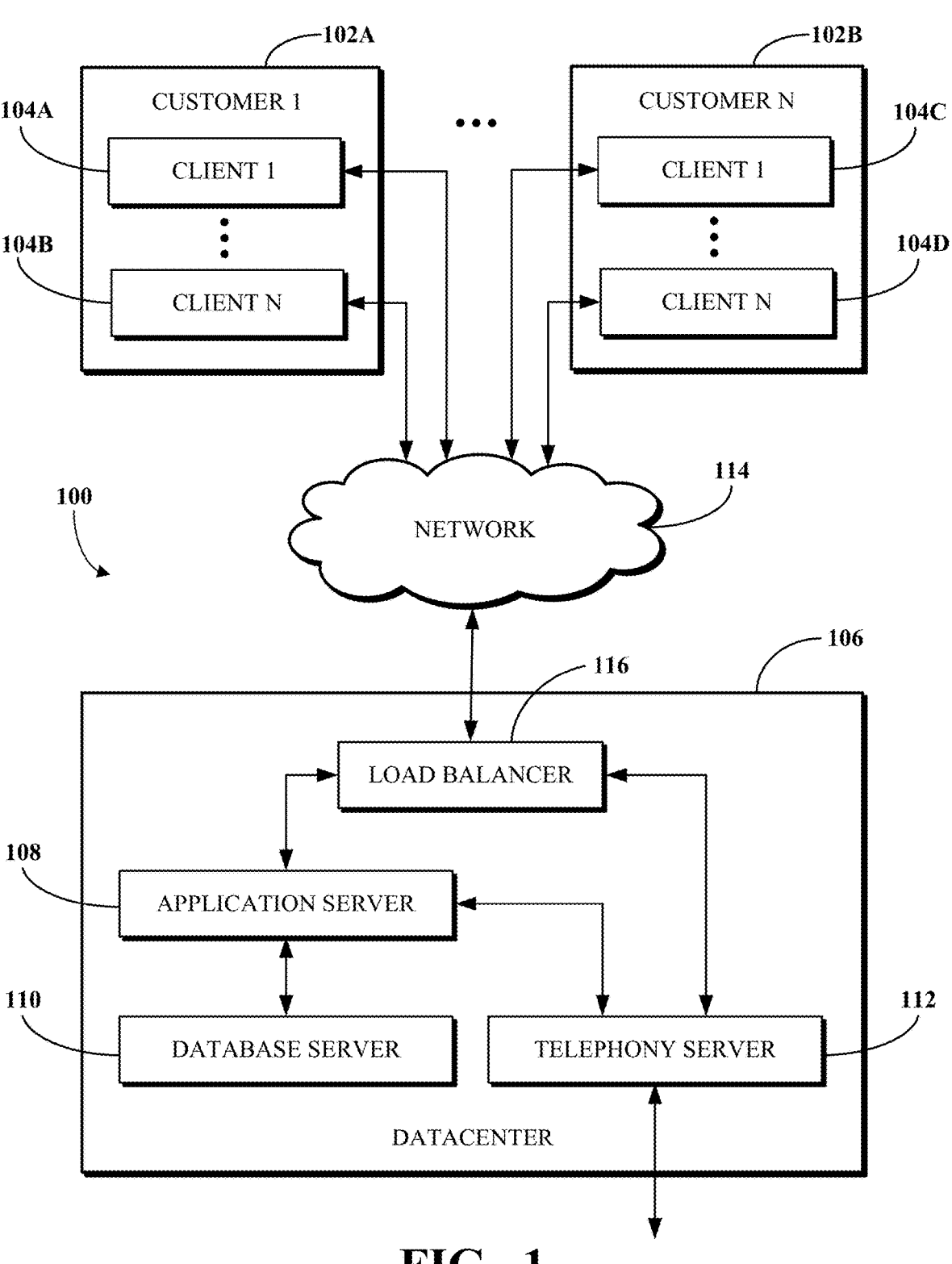
FIG. 1 is a block diagram of an example of an electronic computing and communications system.

A software platform, such as a UCaaS platform, typically handles large amounts of data in connection with the provision of various software services and the use of those services by one or more users or groups of users. For example, the data may include configurations defined for a group of users registered with the software platform. The configurations may include default values or values set by a user and/or by a software aspect. The configurations may, in some examples, refer to user information, user access privileges, application setting information, or the like. Given the potential scale of users and applications involved in the use and delivery of the software services of a software platform, the software platform may be expected to efficiently manage huge amounts of these configurations. Furthermore, because these configurations are often essential to the delivery of software services on a per-user or per-user group basis, it is important for data representative of these configurations to be readily available to the software platform for ease of access and deployment.

Accordingly, a conventional approach to efficient delivery of software services includes the use of a cache system which implements high-speed data storage and retrieval. A conventional cache system may improve data storage and retrieval efficiencies when the amount of data and the computing environment itself scales and is large or relatively large. The cache system can thus provide a significant efficiency advantage where it is used in a system with large numbers of nodes. One example of a cache system which is the Redis key-value caching system, which is an in-memory data structure store that maps keys to types of values and supports various data types. The Redis key-value caching system can enable, amongst other things, at-scale data persistence and replication for large data sets in a distributed service capacity, such as which may be used to deliver software services of a software platform. A typical key-value caching system, such as using Redis, may be of one of a number of possible forms or formats. In one non-limiting example, a key may include a category element representing some category information for a user and an identifier element representing some unique information such as a user identifier. In Redis, the format of the key may appear as category::identifier. For example, the key for a user information object may appear as User_Info::user_id.

In a practical use case, configurations such as those related to user information objects and other data stored by a cache system often need to be changed, such as based on various user group changes, system changes, or the like. To accomplish these changes, it is often necessary to perform a data batch deletion in which large groups of keys are deleted in batches. For example, when an account configuration is changed, the cache system may clear the cache of all user-related configurations under an entire user group. To perform the delete operation, the system users first retrieve all of the keys, or query the cache system to construct all the keys, to do the batch invalidation. This process suffers numerous drawbacks. In one example, deleting a large number of keys in batches is very time-consuming. In another example, deleting a large number of keys in batches will cause the cache system load to surge in a short period of time. That is, when a cache system deletes a large number of cache in batches, it often causes 100% CPU usage, which causes the throughput of the cache system to decrease, and in turn results in slower response of the software platform or associated software services.

Implementations of this disclosure address problems such as these using a versioning group cache system which introduces versioning control information to improve typical key-value caching. The versioning group cache system uses cache keys which each include, amongst other things, version information and a group key. When a cache key is first updated to include these, the cache system determines the group key and adds version information thereto to produce the cache key, which is mapped to cached data. When the cache key is later updated, the version information is updated to produce an updated cache key which is mapped to the cached data. The cache key updating is in response to a change request received at the cache system. The change request includes a command processable at the cache system in connection with cached data and/or cache keys. For example, the change request may be a request for a batch deletion of cache keys. The versioning group cache system fulfills the change requests with efficient use of system resources.

To describe some implementations in greater detail, reference is first made to examples of hardware and software structures used to implement a versioning group cache system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
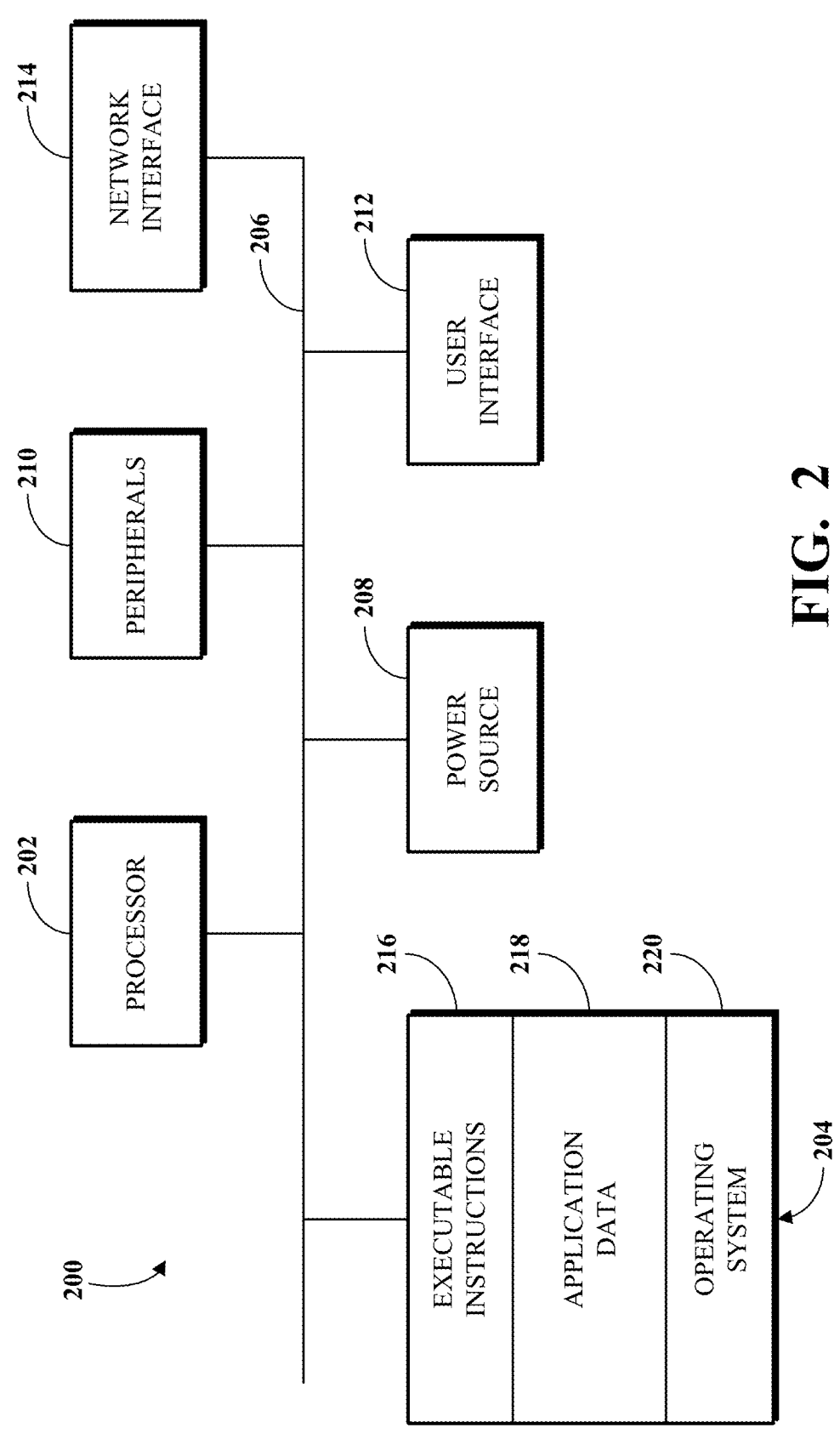
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory

204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
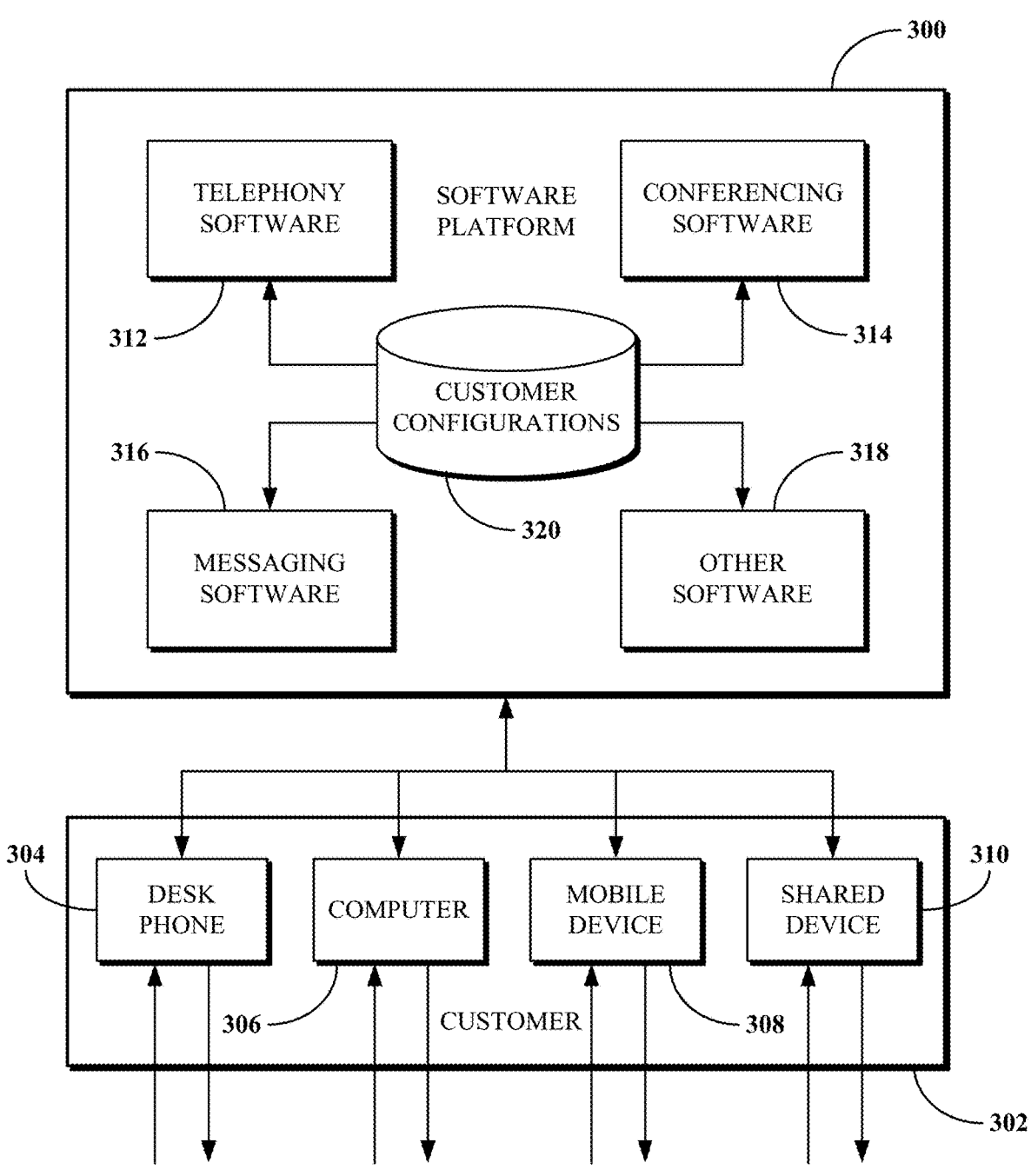
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software used to facilitate, implement, or otherwise provide a versioning group cache system.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
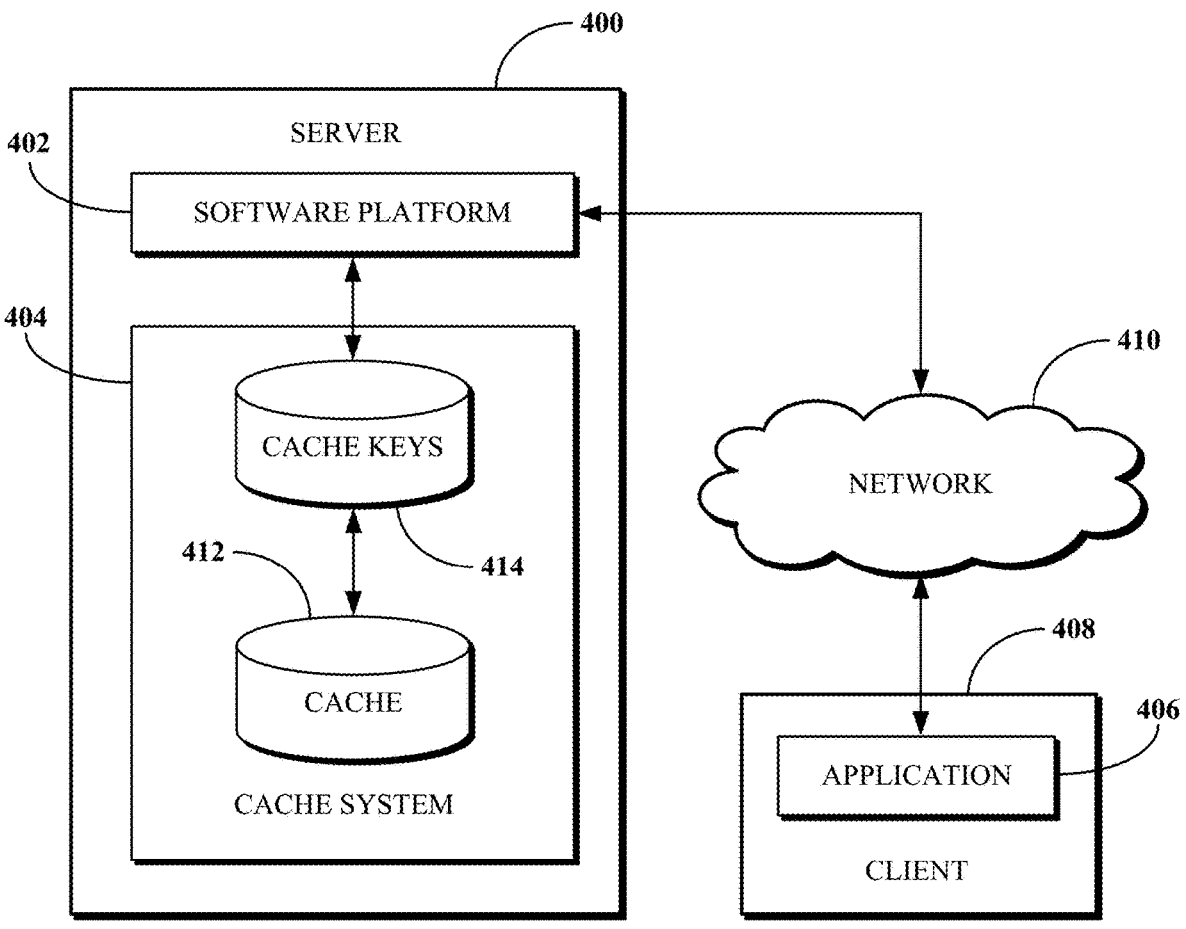
FIG. 4 is a block diagram of an example of a system for cache key production using group version control.

FIG. 4 is a block diagram of an example of a system for cache key production using group version control. As shown, a server 400 implements a software platform 402 and a cache system 404. The software platform 402 includes software services which may be accessed using an application 406 running on a client 408 over a network 410. For example, the server 400 may be a server device at a datacenter, such as the datacenter 106 shown in FIG. 1. For example, the software platform 402 may be the software platform 300 shown in FIG. 3. For example, the application 406 may be a client application and the client 408 may be a client device, such as one of the clients 304 through 310 shown in FIG. 3. For example, the network 410 may be the network 114 shown in FIG. 1.

The cache system 404 is a high-speed data storage aspect which stores data used by the software platform 402. The data may, for example, be data used to implement one or more software services of the software platform 402, data associated with one or more operators (e.g., human users or software intelligence aspects configured for use) of the software platform, backend data associated with the cache system 404 itself or the server 400, other data, or a combination thereof. The data may be in one or more formats, including, without limitation, strings, lists, sets, sorted sets, hashes, bit arrays, probabilistic data structures, streams, and the like. The cache system 404 includes a cache 412 which stores the data and a cache key store 414 which stores cache keys associated with the data stored in the cache 412.

The cache keys stored in the cache key store 414 are key values which are mapped to values of the data stored in the cache 412. The cache keys are binary sequences and may thus be implemented in one or more formats. In one example in which the client 408 is a client device used by an operator of the software platform 402, when the application 406 accesses the software platform 402, the software platform 402 retrieves certain data from the cache 412 using a command which includes a cache key mapped to that data. The cache system 404 resolves the command by identifying the cache key in the cache key store 414 and identifying the data in the cache 412 based on the cache key.

In some cases, the cache system 404 may be used to access, retrieve, and/or delete data stored in the cache 412 and/or cache keys stored in the cache key store 414. For example, a change request may be received by the cache system 404, such as from the software platform 402, a software service thereof, or another source. A change request is a command which may be processed by the cache system 404, for example, a SET, GET, DEL, or other command, respectively to set, get, or delete the value of one or more of the cache keys stored in the cache key store 414.

One example of a change request is a request to delete a batch of cache keys, such as part of a process for clearing the cache 412. For example, the change request may be in response to an account configuration change associated with an operator of the software platform 402, which requires the clearing of data of one or more types from the cache 412. For example, the account configuration change may be resulted in a change in the mapped data stored in the cache 412, thereby eliminating the mappings by the corresponding cache keys in the cache key store 414. The change request may thus be a batch invalidation command performed to replace the cache keys.

In one non-limiting example, the cache system 404 may be or may implement a distributed, in-memory key-value data store and/or cache which enables access to the data stored in the cache 412 using the cache keys stored in the cache key store 414 from a number of locations across a content distribution network or like network. In some implementations, the cache system 404 may be or may implement a RDBMS or another database or data store.

Figure 5:
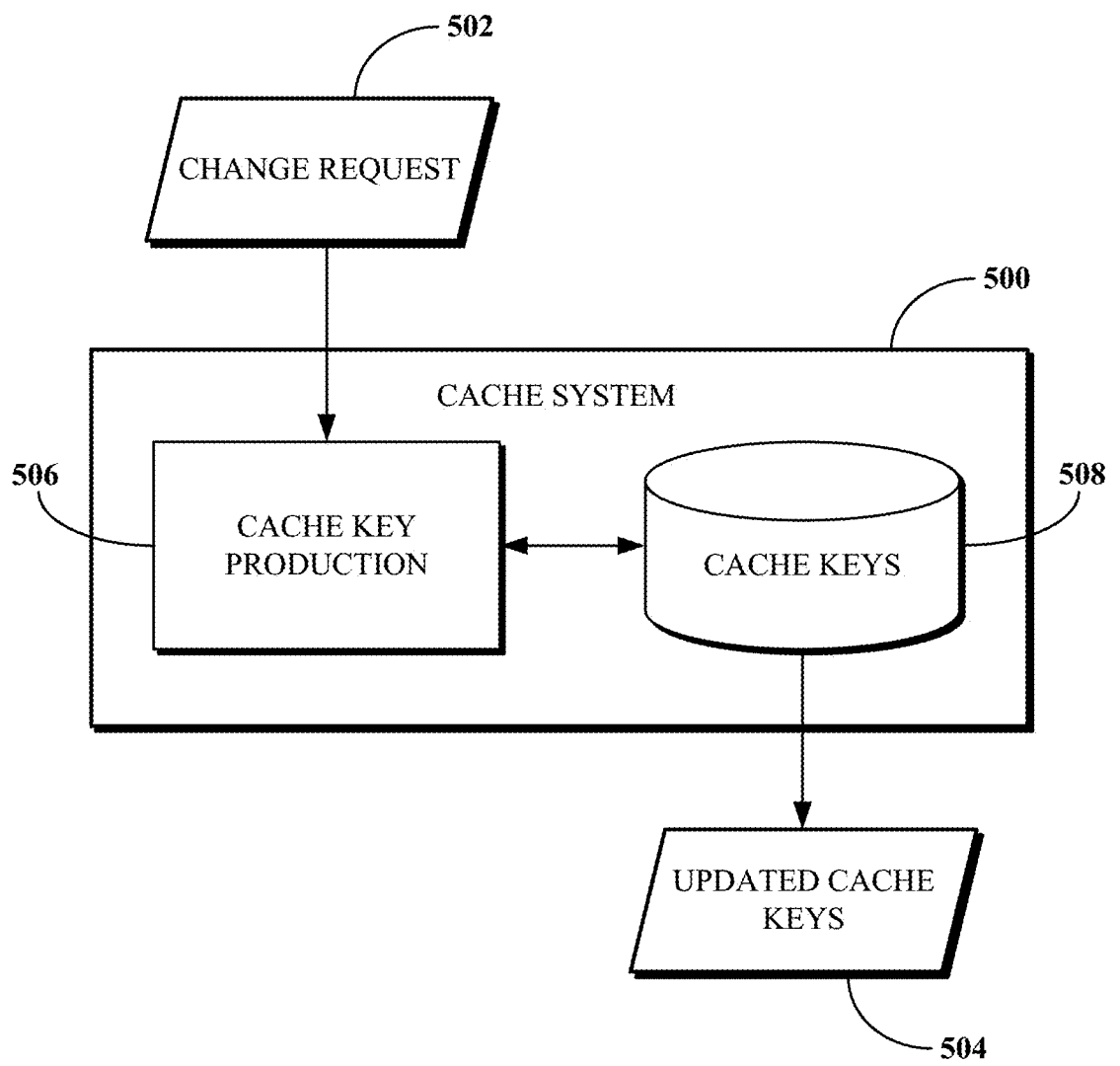
FIG. 5 is a block diagram of an example of a cache system which receives a change request and produces updated cache keys.

FIG. 5 is a block diagram of an example of a cache system 500 which receives a change request 502 and produces updated cache keys 504. The cache system 500 may, for example, be the cache system 404 shown in FIG. 4. The cache system 500 includes cache key production software 506 and a cache key store 508, which may, for example, be the cache key store 414 shown in FIG. 4.

The change request 502 is a command which may be processed by the cache system 500. For example, the change request 502 may be a request to replace one or more of the cache keys stored in the cache key store 508. For example, the change request 502 may be a batch invalidation command that, when processed, causes one or more of the cache keys stored in the cache key store 508 to be replaced by one or more updated cache keys, such as the updated cache keys 504. The cache key production 506 processes the change request 502 to produce the updated cache keys 504 and to store the updated cache keys 504 in the cache key store 508.

In some cases, the cache keys stored in the cache key store 508 may be processed according to the change request 502 from initial forms such as to add group version control information thereto. For example, where the cache keys do not include group version control information, such as where the cache keys are initial cache keys typically used with a key-value database or cache (e.g., Redis), group version control information can be added to the initial cache keys to produce the updated cache keys 504. In some cases, the cache keys stored in the cache key store 508 may be processed according to the change request 502 from forms which already include group version control information. For example, where the cache keys already include group version control information, such as where that group version control information was previously added to the cache keys, the group version control information can be adjusted, such as by incrementing a value thereof to produce the updated cache keys 504.

In either case, the updated cache keys 504 each include group version control information. The group version control information includes a group key including group information added to an initial cache key and version information added in connection with the group key. The group information refers to one or more software platform operators associated with the data with which the subject cache key corresponds. The version information refers to a version number of the cache key. The group information and the version information may be separately added, such as in a sequence or otherwise in different stages, or added concurrently or substantially concurrently such as in part of a single stage or sequence operation. The group version control information is used to control the versioning of the cache keys used with the cache system 500. For example, in a batch deletion operation, the group version control information may be used to increment cache key values rather than requiring full cache key retrievals or constructions. This resource efficient process reduces processor usage and system throughput decrease as compared to a typical batch deletion operation.

Figure 6:
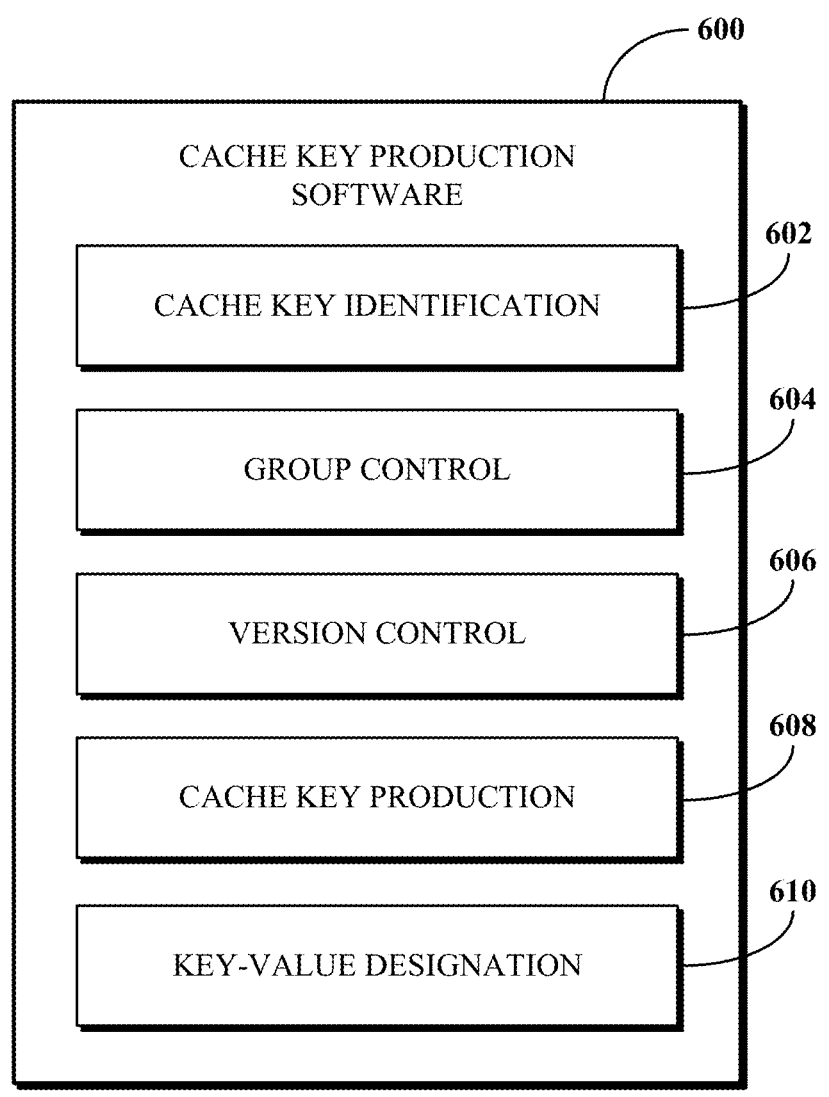
FIG. 6 is a block diagram of example functionality of cache key production software.

FIG. 6 is a block diagram of example functionality of cache key production software 600, which may, for example, be the cache key production software 506 shown in FIG. 5. The cache key production software 600 includes tools for identifying a cache key to update in response to a change request, such as a SET or DEL command received by a cache system (e.g., the cache system 500 shown in FIG. 5) and updating that cache key according to the change request. As shown, the cache key production software 600 includes a cache key identification tool 602, a group control tool 604, a version control tool 606, a cache key production tool 608, and a key-value designation tool 610.

The cache key identification tool 602 identifies a cache key to update based on the change request. For example, the cache key identification tool can parse the change request to identify a cache key referenced therein. In another example, the cache key identification tool can query a cache key store (e.g., the cache key store 508 shown in FIG. 5) for a cache key based on information included in the change request or otherwise based on the change request.

The group control tool 604 verifies whether group information is included in the cache key. In the event the cache key does not include group information, the group control tool 604 determines group information to add to the cache key. In the event the cache key already includes group information, the group control tool 604 may take no further action. In particular, the cache key may not include group information where it is an initial cache key typically used with a key-value database or cache, and the cache key may include group information where it is not in that initial cache key format.

The version control tool 606 verifies whether version information is included in the cache key. In the event the cache key does not include version information, the version control tool 606 determines version information to add to the cache key. In the event the cache key already includes version information, the version control tool 606 determines an update to the version information. In particular, the cache key may not include version information where it includes group information added by the group control tool 504 but otherwise is an initial cache key typically used with a key-value database or cache, and the cache key may include version information where it is not in that initial cache key format.

The cache key production tool 608 produces an updated cache key based on the group information and the version information determined for the cache key. In particular, where group information is determined for the cache key, the cache key production tool 608 produces the updated cache key by adding the group information and the version information to the cache key. However, where group information is not determined for the cache key, such as because the cache key already includes group information, the cache key production tool 608 updates the version information for the cache key and produces the updated cache key based on the updated version information.

The key-value designation tool 610 designates the cache key which is mapped to given data stored within a cache of the cache system (e.g., the cache 412 shown in FIG. 4). In particular, when an updated cache key is produced for given data, the key-value designation tool 610 re-maps the correspondence of that data from the previous cache key to the updated cache key. In some implementations, the previous cache key may remain within the cache system either permanently or until some event occurs, such as the end of a time-to-live policy for the cache system. In some implementations, the previous cache key may be evicted from the cache system in response to the re-mapping of the given data to the updated cache key.

Although the tools 602 through 610 are shown as functionality of the cache key production software 600 as a single piece of software, in some implementations, some or all of the tools 602 through 610 may exist outside of the cache key production software 600 and/or the software platform may exclude the cache key production software 600 while still including the tools 602 through 610 elsewhere. In some implementations, one or more of the tools 602-610 may be implemented using lightweight scripts operating against software of a cache system.

Figure 7A:
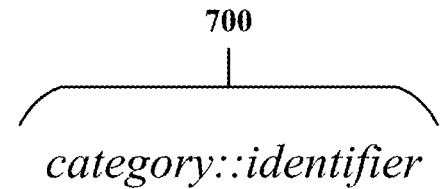
FIGS. 7A-D are illustrations of examples of cache keys used and produced by a cache system.

FIGS. 7A-D are illustrations of examples of cache keys used and produced by a cache system. Referring first to FIG. 7A, an initial cache key 700 is shown by example as including category and identifier elements, represented as category::identifier. The value of category refers to a category of the data associated with the cache key and/or a category of software platform operator associated with that data. The value of identifier refers to a unique identifier for the data. Other forms of an initial cache key including different information or of different formats are possible. The initial element 700 may, for example, represent a format of the initial cache key as is typically used in a key-value database or cache.

Figure 7B:
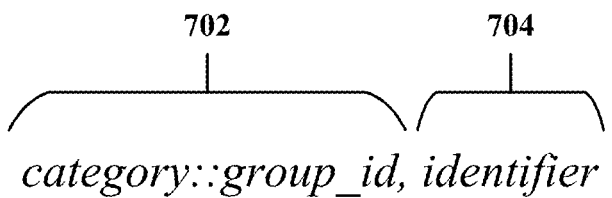

Referring next to FIG. 7B, a modification to the initial cache key 700 is shown by the cache key including a group key element 702 and an identifier element 704. The group key element 702 includes the category element of the initial cache key 700 as well as a group identifier element group id which has been added to the initial cache key 700. For example, the group identifier element group id may refer to group information determined to be added to the initial cache key 700. For example, the category element and the group information may be defined as a group key after the group information is added to the initial key. The identifier element 704 includes the value of identifier from the initial cache key.

Figure 7C:
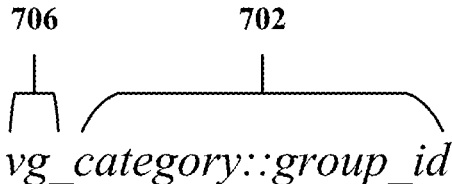

Referring next to FIG. 7C, a further modification to the initial cache key is shown by the cache key including a prefix 706 and the group key element 702, which is used to cache group version information for the cache key within the cache system. The prefix 706 is represented by the element vg, which is one or more binary symbols used with the group key element 702 to push a change to version information associated with the group key element 702. For example, the elements shown in FIG. 7C may represent a command processed by the cache system to cause an update to version information associated with the group key element 702.

Figure 7D:
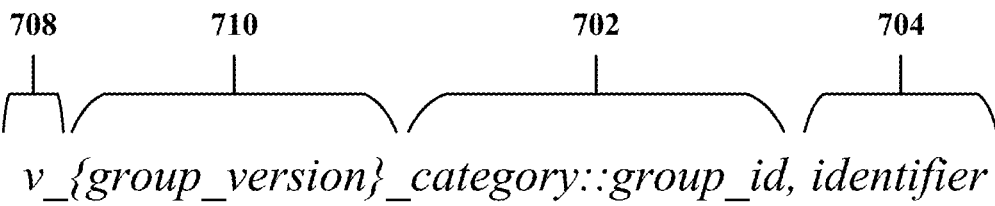

Referring finally to FIG. 7D, an updated cache key as may be produced for and used with a cache system is shown as including a prefix 708, a group version information element 710, the group key element 702, and the identifier element 704. The combination of the elements 708, 710, 702, and 704 represent how an updated cache key may be stored in the cache system.

The prefix 708 is represented by the element v and is one or more binary symbols usable to indicate the start of the updated cache key. The group version information element 710 is represented by the element {group version} and is a value of version information for the cache key. The initial value of the group version information element 710 may, for example, be 1, and updates to the version information may cause the value of the group version information element 710 to increment by 1 or otherwise by some defined integer value.

Examples of values which may be used in place of the generic elements shown in FIGS. 7A-D are now described. An initial cache key USER_INFO::user_id, such as which may be shown in FIG. 7A, includes a category element USER_INFO and an identifier element user_id, in which the category element refers to a category of data for storing user information and the identifier element refers to a type of user information, such as a unique user identifier. Group information may be added to the initial cache key using the element account_id as shown in FIG. 7B to reflect a group key element of USER_INFO::account_id. A prefix vg may be added to the group key element as shown in FIG. 7C as vg USER_INFO::account_id. This causes version information to be determined for and added to the cache key within the cache system, such that the updated cache key v 1 USER_INFO::account_id, user_id is produced and stored, such as is shown in FIG. 7D. Later, based on a change request received by the cache system, such as a request to clear all of the user cache associated with a group of software platform users associated with account_id, vg USER_INFO::account_id is again pushed to the cache system to cause an update to the version information of the updated cache key. This results in a new updated cache key being produced in which the new updated cache key has a higher version information value than the previous cache key. For example, the new updated cache key produced and stored by the cache system may be represented as v_2_USER_INFO::account_id, user_id, such as again is as shown in FIG. 7D. Once the new updated cache key v_2_USER_INFO::account_id, user_id is produced, it is mapped to the underlying data and the previous cache key v_1_USER_INFO::account_id, user_id is no longer read or used by the cache system.

Figure 8:
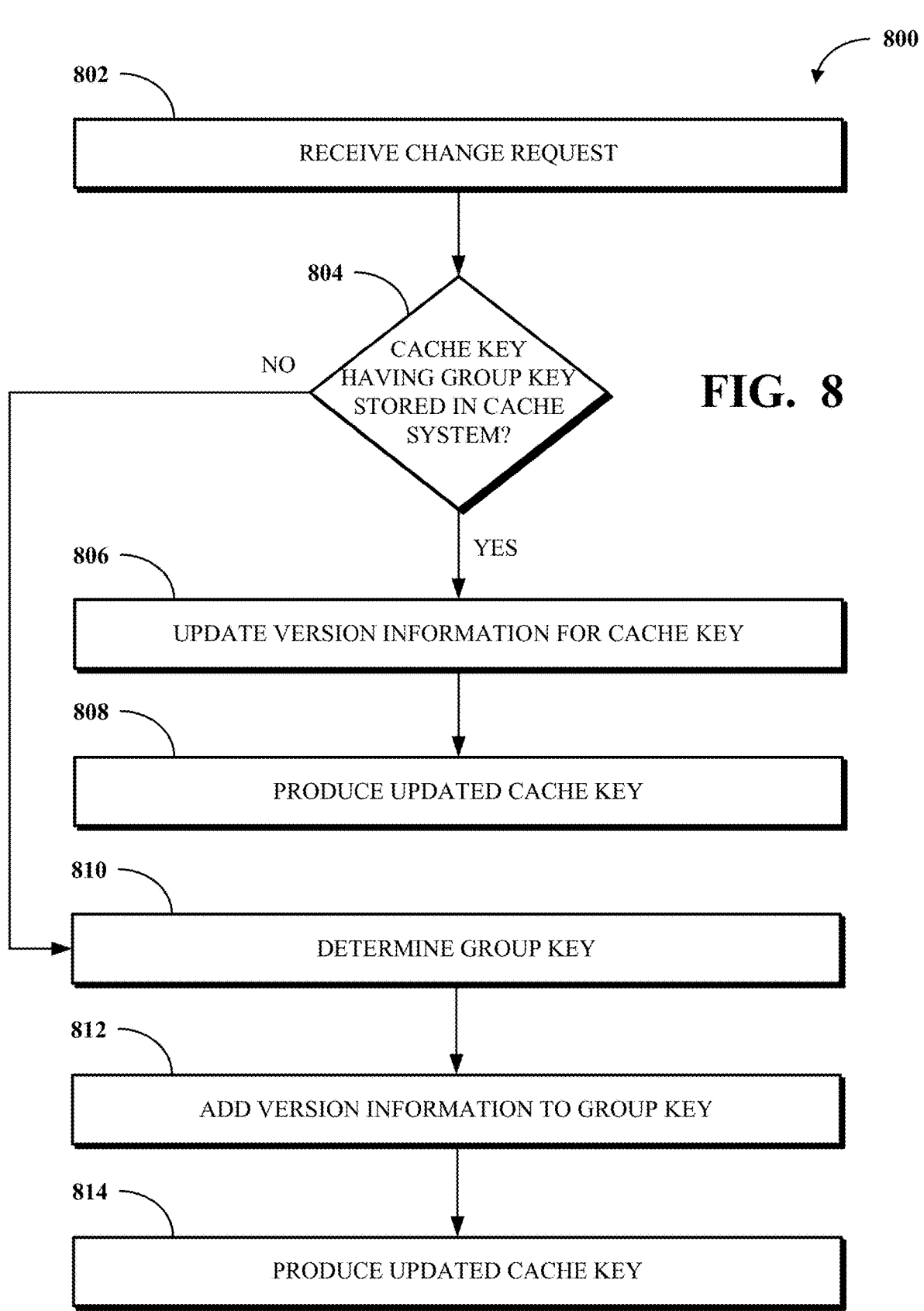
FIG. 8 is a flowchart of an example of a technique for cache key production using group version control.

To further describe some implementations in greater detail, reference is next made to examples of techniques which may be performed by or using a versioning group cache system. FIG. 8 is a flowchart of an example of a technique for cache key production using group version control. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a change request is received. The change request is received at a cache system. The change request may be received from a software platform which uses the cache system, from a device of an operator of the software platform, or another source. The change request includes a command (e.g., a GET, SET, DEL, or like command) which may be processed at the cache system to cause a change in some or all of the cached data or cache keys stored in the cache system. For example, the change request may include a command to delete a batch of cache keys including one or more initial cache keys from the cache system. For example, the batch of cache keys may be associated with a group of operators of a software platform which uses the cache system.

At 804, a determination is made as to whether one or more cache keys having a group key are stored in the cache system. The group key includes one or more elements for identifying a group of cache keys as defined using the cache system. The group key may thus be shared by one or more cache keys. For example, the change request may identify the group key. Determining whether a cache key stored in the cache system has the group key includes identifying any cache keys stored in a cache key store of the cache system which include the group key, such as by parsing the cache keys or searching or querying the cache key store.

At 806, responsive to a determination that one or more cache keys having the group key are stored in the cache system, version information for the one or more cache keys is updated. The version information is associated with the group key and thus may be the same for each of the cache keys which share the group key. Updating the version information can include incrementing a value of the version information, such as responsive to identifying the cache key based on the change request.

At 808, an updated cache key is produced based on the group key and the updated version information. For example, producing the updated cache key may include creating a new cache key including the group key and the updated version information. In another example, producing the updated cache key may include modifying the previous cache key to include the updated version information in connection with the group key. The updated cache key is then mapped to the data previously associated with the previous cache key. Responsive to the mapping of the updated cache key to the data, the cache system may continue to store the previous cache key according to a time-to-live policy. However, the previous cache key may be unreadable using the cache system responsive to the mapping of the updated cache key to the data. In particular, the cache system may hide the previous cache key in response to the production or mapping of the updated cache key, such as due to the previous cache key becoming outdated by the production or mapping of the updated cache key.

In this path resulting in the production of the updated cache key based on the group key and the updated version information, the change request may be considered a second change request. For example, a first change request may have earlier been received and processed to result in the production of the previous cache key, which itself is an updated cache key produced based on the group key and previous version information.

Alternatively, at 810, responsive to a determination that the cache system does not store a cache key which has the group key, the group key is determined. Determining the group key can include producing the group key based on one or more elements of the previous cache key, which in this case is likely formatted according to a typical cache key used with a key-value database. In some cases, the group key can be determined using input received from a device operator, such as in combination with the elements of the previous cache key or otherwise.

At 812, after the group key is determined, version information is added to the group key. The version information represents that the group key is on a first version, such as using the integer value 1 or otherwise. Adding the version information to the group key can include concatenating the version information and the group key within a binary sequence to be used within an updated cache key to be produced.

At 814, the updated cache key is produced using the group key and the version information. For example, producing the updated cache key may include creating a new cache key including the group key and the updated version information. In another example, producing the updated cache key may include modifying the previous cache key to include the updated version information in connection with the group key. The updated cache key is then mapped to the data previously associated with the previous cache key. Responsive to the mapping of the updated cache key to the data, the cache system may continue to store the previous cache key according to a time-to-live policy. However, the previous cache key may be unreadable using the cache system responsive to the mapping of the updated cache key to the data. In particular, the cache system may hide the previous cache key in response to the production or mapping of the updated cache key, such as due to the previous cache key becoming outdated by the production or mapping of the updated cache key.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media (e.g., as a non-transitory computer readable medium storing instructions operable to cause one or more processors to perform operations), and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, at an in-memory cache system of a server in which the in-memory cache system uses a key-value data store to access data stored in a cache of the in-memory cache system, a change request to update cached data associated with one or more cache keys; and
performing the change request by:
determining, by the server, whether the in-memory cache system stores a cache key having a group key associated with the one or more cache keys;
producing, by the server based on a determination that the in-memory cache system does not store a cache key having the group key, the group key;
adding, by the server, version information to the group key; and
updating, by the server using the group key having the added version information, the one or more cache keys within the cache.

2. The method of claim 1, wherein producing the group key comprises:
producing the group key based on one or more elements of a previous cache key associated with the change request.

3. The method of claim 1, wherein adding the version information to the group key comprises:

concatenating the version information and the group key within a binary sequence for use in updating the one or more cache keys.

4. The method of claim 1, wherein updating the one or more cache keys within the cache comprises:

producing a new cache key including the group key and the added version information.

5. The method of claim 1, comprising:

determining that no cache key stored in the key-value data store includes the group key.

6. The method of claim 1, comprising:

updating, based on a second change request associated with the cached data, the version information to produce an updated cache key associated with the cached data.

7. The method of claim 1, wherein the change request identifies the group key.

8. The method of claim 1, wherein the change request includes a command to set, get, or delete a value of the one or more cache keys.

9. The method of claim 1, wherein the in-memory cache system is used by a unified communications as a service platform.

10. A non-transitory computer readable medium storing instructions operable to cause one or more processors to perform operations comprising:

receiving, at an in-memory cache system of a server in which the in-memory cache system uses a key-value data store to access data stored in a cache of the in-memory cache system, a change request to update cached data associated with one or more cache keys; and performing the change request by:

determining, by the server, whether the in-memory cache system stores a cache key having a group key associated with the one or more cache keys;

producing, by the server based on a determination that the in-memory cache system does not store a cache key having the group key, the group key;

adding, by the server, version information to the group key; and updating, by the server using the group key having the added version information, the one or more cache keys within the cache.

11. The non-transitory computer readable medium of claim 10, wherein producing the group key comprises:

querying the key-value data store to identify any cache keys that include the group key.

12. The non-transitory computer readable medium of claim 10, wherein the version information and the group key are concatenated within a binary sequence by adding the version information to the group key.

13. The non-transitory computer readable medium of claim 10, the operations comprising:

receiving a second change request associated with the cached data; and updating, based on the second change request, the version information.

14. The non-transitory computer readable medium of claim 10, wherein the group key includes a category element and group information, and wherein, based on the update to the one or more cache keys, the one or more cache keys include a sequence of the version information, the category element, and the group information.

15. A system, comprising:

a server implementing an in-memory cache system using one or more memories and one or more processors, wherein the one or more processors are configured to execute instructions stored in the one or more memories to:

receive, at the in-memory cache system in which the in-memory cache system uses a key-value data store to access data stored in a cache of the in-memory cache system, a change request to update cached data associated with one or more cache keys; and perform the change request to:

determine, by the server, whether the in-memory cache system stores a cache key having a group key associated with the one or more cache keys produce, by the server based on a determination that the in-memory cache system does not store a cache key having the group key, the group key;

add, by the server, version information to the group key; and update, by the server using the group key having the added version information, the one or more cache keys within the cache.

16. The system of claim 15, wherein, based on the update to the one or more cache keys, the cached data is mapped to the one or more cache keys and a previous cache key previously mapped to the one or more cache keys is evicted from the in-memory cache system.

17. The system of claim 15, wherein the group key is produced based on a previous cache key.

18. The system of claim 15, wherein, to update the one or more cache keys within the cache, the one or more processors are configured to execute the instructions to:

produce a new cache key including the group key and the added version information; or update a previous cache key to include the group key and the added version information.

19. The system of claim 15, wherein one of the one or more cache keys is an initial cache key corresponding to a user id or an account id and, based on the update to the one or more cache keys, the user id or the account id is associated with the group key and the version information.

20. The system of claim 15, wherein the change request is a batch invalidation command to replace a batch of cache keys including the one or more cache keys.

* * * * *